United States Patent

Wake et al.

[11] Patent Number: 5,917,636
[45] Date of Patent: Jun. 29, 1999

[54] GENERATION OF RADIO FREQUENCY MODULATED OPTICAL RADIATION

[75] Inventors: David Wake, Levington; David G. Moodie; Derek Nesset, both of Ipswich, all of United Kingdom

[73] Assignee: British Telecommunications public limited company, London, United Kingdom

[21] Appl. No.: 08/716,187

[22] PCT Filed: Mar. 17, 1995

[86] PCT No.: PCT/GB95/00589

§ 371 Date: Sep. 30, 1996

§ 102(e) Date: Sep. 30, 1996

[87] PCT Pub. No.: WO95/27346

PCT Pub. Date: Oct. 12, 1995

[30] Foreign Application Priority Data

Jul. 29, 1994 [GB] United Kingdom ................. 94305661

[51] Int. Cl.⁶ .................................................... H04B 10/04
[52] U.S. Cl. ........................... 359/180; 359/145; 359/181
[58] Field of Search .................................. 359/145–146, 359/151, 160, 162, 173, 179, 180–181, 188; 379/56

[56] References Cited

U.S. PATENT DOCUMENTS 5,434,693 7/1995 Tanaka et al. ........................... 359/162

FOREIGN PATENT DOCUMENTS 0346925 12/1989 European Pat. Off. ............... 359/145

OTHER PUBLICATIONS

Ogawa, "Microwave and Millimetre Wave Fibre Optic technologies for Subcarrier Transmission Systems", IEICE Transactions On Communications, vol. E76B, No. 9, Sep. 1993, Tokyo JP, pp. 1078–1090.
McQuate, "Calibration of Lightwave Detectors to 50 GHz", Technologies For Optical Fiber Communications, Jan. 25,1994, Los Angeles, pp. 336–344.
Polifko et al, "Millimeter Wave Optical Transmission With Combination Narrowband EOM and Laser Modulation", Fourth Optoelectronics Conference (OEC '92) Technical Digest, Jul. 1992, Tokyo, JP, pp. 250–251.
Yu et al., "Design and Fabrication of InGaAsP/InP Waveguide Modulations for Microwave Applications" SPIE, vol. 1703 (1992), pp. 304–312.

Primary Examiner—Knife-Michael Negash
Attorney, Agent, or Firm—Nixon & Vanderhye P.C.

[57] ABSTRACT

Radio frequency modulated optical radiation is generated for use in a radio over fibre communications system. A semiconductor electroabsorption modulator efficiently modulates an input optical signal at harmonics of the electrical modulation frequency applied to the electroabsorption modulator. A low frequency design, and thus low cost, electroabsorption modulator is utilized to generate higher order harmonics of an electrical drive signal for use in a radie over fibre communications systems.

14 Claims, 5 Drawing Sheets

- ● DC
- + 1ST HARMONIC
- ○ 2ND HARMONIC
- × 3RD HARMONIC
- ■ 4TH HARMONIC
- □ 5TH HARMONIC

GENERATION OF RADIO FREQUENCY MODULATED OPTICAL RADIATION

BACKGROUND OF THE INVENTION

1. Field of the Invention

The present invention relates to a method of generating modulated optical signals, and to a source of modulated optical radiation, and in particular to the use of a semiconductor electroabsorption modulator in a radio over fibre communication system.

2. Related Art

Demand for broadband telecommunication services to the home and to small business is expected to increase dramatically over the next decade. Optical fibre and millimeter-wave radio are both individually capable of supporting the large bandwidth requirements associated with these services. Providing optical fibre cabling direct to the home or business is one way of providing high capacity, but for operational reasons this is not always an appropriate solution. Alternatively millimeter-wave radio systems, such as the RACE Mobile Broadband system or radio LANs, are flexible and offer the advantage of expedient provision.

In recent years a hybrid of these two technologies has been developed, and is termed radio over fibre. Radio over fibre systems utilise optical fibre transmission to deliver radio signals directly to a point of free space radiation, usually an antenna site. Dependent on the application of the radio over fibre system, the radio signals may be of VHF, UHF, microwave or millimeter frequency. In general, a radio over fibre communications system will comprise a first, or central site, where an optical signal having a radio frequency carrier is generated, a second, or remote site, linked to the first site by an optical fibre, the second site having a transmitting radio antenna, and a third site having a receiving radio antenna. Thus,, data encoded on the optical carrier at the first site is optically transmitted, via the optical fibre, to the remote site, transmitted as a free space radio signal from the remote site to the receiving radio antenna at the first site, and demodulated. By delivering the radio signal optically, via the optical fibre link, it is unnecessary to generate a high frequency radio carrier at the remote site, which is usually not easily accessible, and not in a benign environment. Optical fibre is an ideal transmission medium for this purpose due its low loss, high frequency, and wide band capability. The principle advantage of radio over fibre systems is their ability to concentrate most of the expensive, high frequency equipment at a centralised location, allowing the remaining equipment at the remote site to be simple, small size, lightweight, and low power consumption. This results in straight forward installation, low maintenance, and a range of simplified options for electrical power provision. The centralisation of high frequency equipment also increases operational flexibility and the potential for frequency reuse or sharing between a number of users. Furthermore, the radiation frequency can be controlled centrally, in an environment shielded from severe climatic variations, and therefore can be extremely stable.

A key issue for radio over fibre communications systems will be the efficient generation of radio frequency modulated optical signals, since in order to benefit from the principle advantage of radio over fibre systems, the radio frequency carrier, modulated onto the optical signal, must be suitable for direct retransmission by a transmitting radio antenna, without upconversion. While techniques and components exist for generating modulated optical signals at lower radio frequencies, e.g. 1 GHz to 15 or even 20 GHz, as the required radio frequency modulated optical signal increases in frequency it is increasingly difficult to generate these optical signals efficiently, and cost effectively. Higher frequency radio over fibre communication systems are particularly attractive for a number of applications such as Multipoint Video Distribution Services (MVDS), and Mobile Broadband Systems (MBS). Frequency bands in the millimeter-wave range have been allocated in Europe to both these applications at 40 to 42 GHz and 62 to 66 GHz respectively. The advantages for working in these higher frequency bands stem not only from the availability of these areas of the electromagnetic spectrum, but also from technical factors such as high antenna gain, small physical antenna size, and good frequency re-use resulting from high propagation losses beyond line of sight paths, and from atmospheric attenuation. If higher frequency radio over fibre communication Systems are to be commercially viable, then a low cost method of generating radio frequency modulated optical signals is essential.

There are number of known techniques for generating radio frequency, and in particular millimeter-wave, modulated optical signals. Although direct modulation of laser diodes is not feasible at millimeter wave frequencies, resonant enhancement of the laser frequency response, by use of an external cavity, can generate modulated optical signals at a frequency of 45 GHz see for example J B Georges, N H Kiang, K Heppell, M Sayed, and K Lau, "Optical Transmission of Narrowband Millimeter-wave Signals by Resonant modulation of Monolithic Semiconductor Lasers", IEEE Photonic Technology Letters, Vol 6, No. 4, pp 568–570, 1994. However resonant enhancement techniques fundamentally limit the bandwidth of any data signals to be carried by the communications system. Optical heterodyning is a technique that can give very efficient optical signal generation, but which requires complex stabilisation to achieve a beat signal with low phase noise, see for example D C Scott, D V Plant, and H R Fetterman "60 GHz Sources Using Optically Driven Heterojunction Bipolar Transistors", Applied Physics Letters, Vol 6, No. 1, pp 1–3, 1992. Harmonic generation techniques, in which harmonics of the electrical drive signal applied to an optoelectronic component are utilised, are attractive because they allow relatively low frequency, and thus low cost, optoelectronic components to be utilised, and because the purity of the optical signal is derived from the electrical drive signal. Both lasers and optical modulators have been used for harmonic generation of radio frequency modulated optical signals. An optical frequency modulated laser, in combination with a dispersive fibre was used by D Wake, I C Smith, N G Walker, I D Henning, and R D Carver, in "Video Transmission Over a 40 GHz Radio-fibre Link", Electronics Letters, Vol. 28, No. 21, pp 2024–2025, 1992. This technique suffers from the disadvantage that a controlled amount of dispersion must be present. Harmonic generation using Mach-Zehnder (HZ) modulators has also been demonstrated, for example by J J O'Reilly, P M Lane, R Heiderman and R Hofstetter, "Optical Generation of Very Narrow Linewidth Millimeter-wave Signals", Electronics Letters, Vol. 28, No. 25, pp 2309–2311, 1992.

In general when utilising harmonic generation, it is desirable to use the lowest possible harmonic, because higher order harmonics contain less power, and thus result in shorter maximum free space transmission distance. However, in order to utilise a lower order harmonic to generate a given free space transmission frequency, the harmonic generator must be designed to operate at a higher frequency. For semiconductor modulators this increases the complexity of the modulator design, and the cost of packaging the modulator. As the design frequency of a modulator is increased, small imperfections in the packaging have a greater effect on the performance of the modulator since their size approaches the wavelength of the electrical signals employed. In addition, any resonant modes of the package need to be carefully analysed and avoided if it is to be operated at higher frequencies. Furthermore, parasitics (such as bond wire inductance) and the loss of dielectric materials both affect the performance of the modulator at higher frequencies. Thus it is particularly important that an optical modulator employed for harmonic generation can efficiently generate harmonics, so that a low frequency design of modulator can nevertheless give sufficient power in a higher harmonic for free space transmission.

SUMMARY OF THE INVENTION

An object of the present invention is the efficient generation of radio frequency modulated optical signals.

According to a first aspect of the present invention there is provided a source of radio frequency modulated optical radiation comprising a semiconductor electroabsorption modulator, having an optical input, an electrical input and an optical output, and comprising a source of radio frequency electrical radiation, electrically connected to the electrical input of the semiconductor electroabsorption modulator, wherein optical signals input to the optical input of the semiconductor electroabsorption modulator are modulated at harmonics of the electrical radiation frequency and are output from the optical output of the semiconductor electroabsorption modulator.

The present invention is based on the discovery, that a semiconductor elactroabsorption modulator can efficiently modulate an optical signal at harmonics of the electrical modulation frequency applied to the electroabsorption modulator.

According to a second aspect of the present invention there is provided a radio over fibre communications system, comprising a source of radio frequency modulated optical signals at a first site, a transmitting radio antenna at a second site, a receiving radio antenna at a third site, and an optical fibre coupled at a first and to the source of radio frequency modulated optical signals, and at a second and to the transmitting radio antenna, so that signals generated at the first site are transmitted optically to the second site via the optical fibre, and are then transmitted from said transmitting radio antenna at the second site to said receiving radio antenna at the third site via free space, wherein said source of radio frequency modulated optical signals comprises a semiconductor electroabsorption modulator.

According to a third aspect of the present invention, there is provided a method of generating a modulated optical signal, the method comprising the steps of:

inputting an optical signal to a semiconductor electroabsorption modulator;

applying an electrical modulation signal to the semiconductor electroabsorption modulator;

and outputting an optical signal, modulated at harmonics of the electrical signal, from the electroabsorption modulator.

BRIEF DESCRIPTION OF THE DRAWINGS

Embodiments of the present invention will now be described, by way of example only, with reference to the accompanying figures in which.

DETAILED DESCRIPTION OF EXEMPLARY EMBODIMENTS

Figure 1:
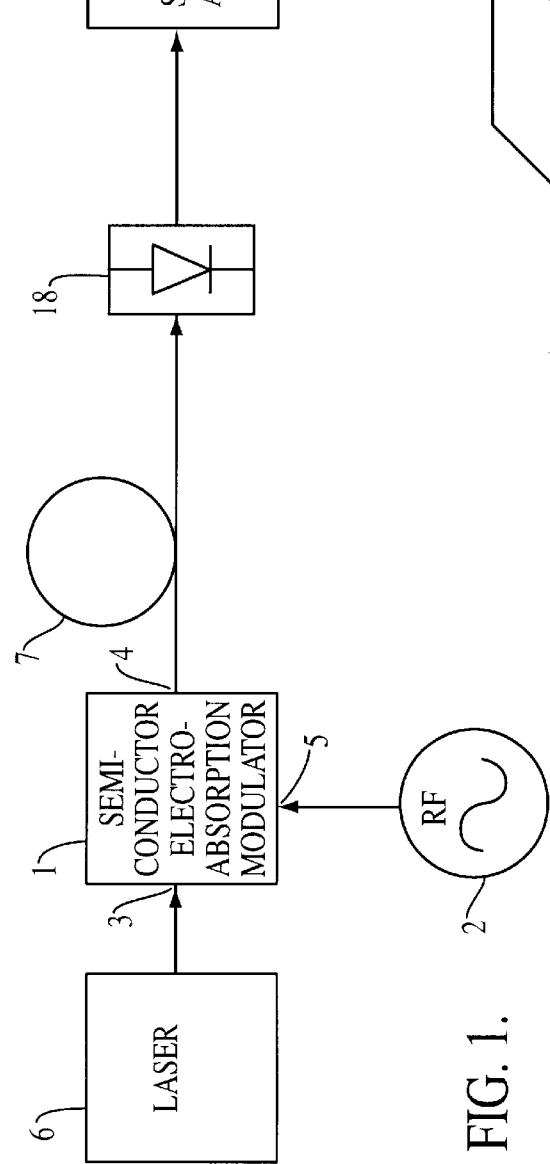
FIG. 1 is a schematic representation of an experimental configuration for measuring harmonic generation.

FIG. 1 shows a source of radio frequency modulated optical radiation, according to the present invention, comprising a seconductor electroabsorption modulator 1 and a source of radio frequency electrical radiation 2. The semiconductor electroabsorption modulator 1 has an optical input 3, an optical output 4, and an electrical input 5. FIG. 1 also shows a laser 6 coupled to the optical input 3 of the electroabsorption modulator 1, an optical fibre 7 coupled to the optical output 4 of the electroabsorption modulator 2, a high speed photodiode 18 and an RF spectrum analyser 19.

Figure 2:
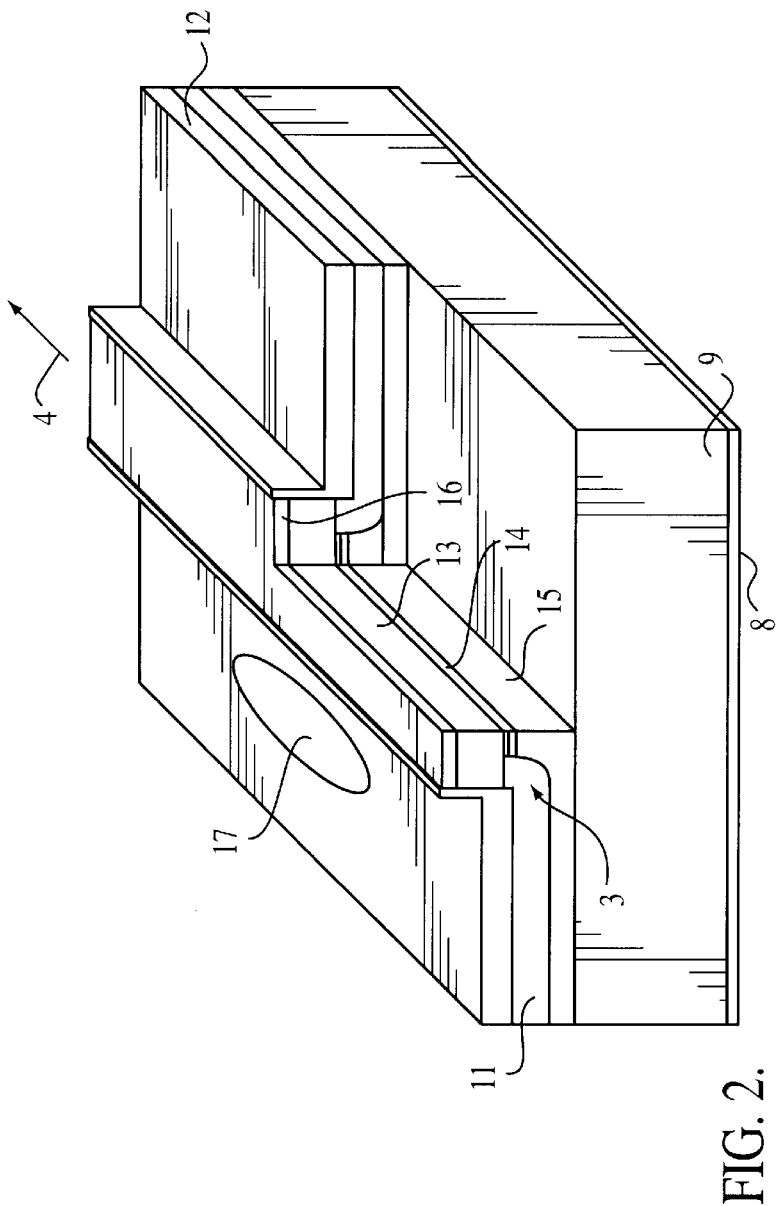
FIG. 2 is a schematic representation of an electroabsorption modulator according to the present invention.

FIG. 2 shows the electroabsorption modulator 1 in greater detail. The electroabsorption modulator 1 is grown utilising standard MOVPE techniques known to those skilled in the semiconductor growth field. The electroabsorption modulator comprises a reverse biased PIN junction in combination with an optical waveguide. On an InP substrate layer 9 is grown an InP buffer layer 15. The buffer layer 15 is 3 $\mu$m thick and is doped with $1\times10^{18}$ cm$^{-3}$ S. Above the buffer layer 15 is grown an electroabsorption layer 14, and above this a 0.4 $\mu$m thick Zn $5\times10^{17}$ cm$^{-3}$ doped layer of InP 13. These three layers, 13, 14 and 15, form both the PIN junction and the optical waveguide. To acheive the ridge structure shown in FIG. 2, standard photolithograpy, etching and overgrowth techniques are employed. The PIN junction is embedded in an iron-doped $10^{17}$ cm$^{-3}$ (semi-insulating) current blocking structure, so as to ensure that the modulating voltage applied to the elsctroabsorption modulator 1 is efficiently directed across the electroabsorption layer 14. The nInP substrate 9 is metallised by a layer of TiAu to provide a contact layer 8, and the top of the device is passivated by an ASG dielectric layer 11. Contact is made to the top of the device via a p++ ternary contact layer 16 and a TiAu bond pad 17.

The electroabsorption layer 14 comprises a multi-quantum well structure of 17 periods of 94 Å InGAsP wells ($\lambda$=1.55 $\mu$m) and 55 Å InGaAsP barriers ($\lambda$=1.1 $\mu$m). This multi-quantum well structure is designed so that the quantum confined Stark effect can be utilised to give a sharp absorption characteristic, in a manner known to the skilled person. In order to give rise to a large change in absorption with voltage applied to the electroabsorption modulator 1, the multi-quantum well structure should be designed so that application of an electric field to the electroabsorption modulator 1 shifts the exciton peak of the MQW structure past the operating wavelength of the electroabsorption modulator 1. The MQW structure disclosed herein has been designed to work most efficiently at an input wavelength to the electroabsorption modulator of 1555 nm. Beneath the electroabsorption layer 14 is an n doped InP layer 15 completing the PIXE junction.

Figure 3:
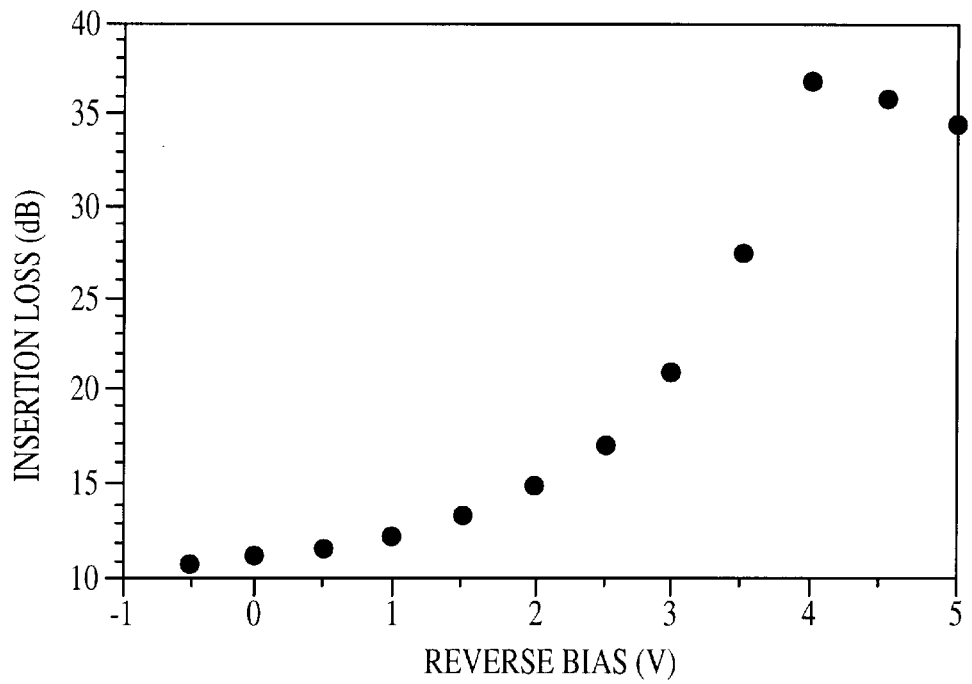
FIG. 3 is a graph showing the absorption characteristic of an electroabsorption modulator at a wavelength of 1555 nm.

The electroabsozption modulator 1 was chosen to be 325 μm long, in the direction of the optical waveguide. As the length of the electroabsorption modulator is increased, its capacitance is also increased, which reduces its operating speed. However for a high modulation depth, i.e. good contrast between the on and off state, a high absorption through the device is required. Absorption increases with the device length and with the confinement factor, however increasing confinement factor reduces the electric field across the electroabsorption layer for a given applied voltage, it has been found that electroabsorption modulators between 150 and 350 μm represent a good compromise between these conflicting requirements. The electroabsorption modulator chip is antireflection coated at and facets 3 and 4, and packaged in a high speed, fibre pigtailed module. The capacitance at 1 MHz of the device was measured to be 0.47 pF, and, utilising a 15 Ω, 10 nF, impedance matching circuit, the small signal 3 dB electrical bandwidth of the packaged electroabsorption modulator is 10.7 GHz. The packaged device has an on-state fibre-to-fibre insertion loss of 10.8 dB at the input wavelength of 1555 nm. The measure absorption characteristic of the electroabsorption modulator is shown in FIG. 3. As can be seen from FIG. 3 the device has a sharp absorption characteristic.

In order to demonstrate the efficiency with which an electroabsorption modulator can harmonically generate radio frequency modulated optical signals, an electroabsorption modulator is compared, both theoretically and experimentally, with a Mach-Zehnder modulator. The Mach-Zehnder modulator used for this comparison is a commercially available Ti: $LiNbO_3$ HZ modulator (model no. Y-35-8931-01), purchased from GEC Advanced Optical Products (West Hanningfield Road, Great Baddow, Chelmsford, Essex). The Hach-Zehnder modulator has a bandwidth of 8 GHZ, a minimum optical insertion loss of 9.5 dB and has values of $V_z$ (the applied voltage required to drive the modulator from maximum to minimum transmission) under DC modulation, and modulation at 2.5 GHz, of 7.7V and 14.9V respectively. These two values are significantly different because when the HZ modulator is driven at RF frequencies an impedance transformer is used to connect the travelling wave electrode, of characteristic impedance 22 Ω, to the 50 Ω input. For the experimental comparison of the two modulators the configuration of FIG. 1 was utilised. The drive frequency of the electrical oscillator 2 was set to 2.5 GHz, so that the results of the comparison are not affected by the limited electrical frequency response of the modulators. The optical input power to the modulators from laser 6 was set to 1 mW, and the harmonics generated by each modulator were measured using the high speed photodiode 18 (having a bandwidth of 18 GHz ) and the RF spectrum analyser 19. The power of the first five harmonics was measured over a range of DC bias voltages applied to each of the modulators. For both electroabsorption modulators measurements were taken for two values (+16 and +22 dBm) of applied power of the 2.5 GHz sinusoidal electrical waveform, measured across a 50 Ω load.

Harmonic generation using the electroabsorption modulator is modelled by fitting a spline curve to the absorption characteristic shown in FIG. 3, and calculating the Fourier series amplitudes of the transmitted light intensity that results from applying a sinusoidal drive voltage. Results are normalised for an optical input power of 1 mW, and ideal photodiode characteristics are assumed for conversion to RF output power. The actual modulator insertion loss is used in the calculations (10.8 dB).

The Hach Zehnder modulator is modelled in the same way as the electroabsorption modulator. The effective value of $V_z$ is different from the figure specified, as a result of the internal impedance transformation from the system impedance (50 Ω) to the modulator transmission line impedance (22 Ω). For the particular modulator employed, the effective value of $V_z$ is calculated to be 15V.

Figure 4A:
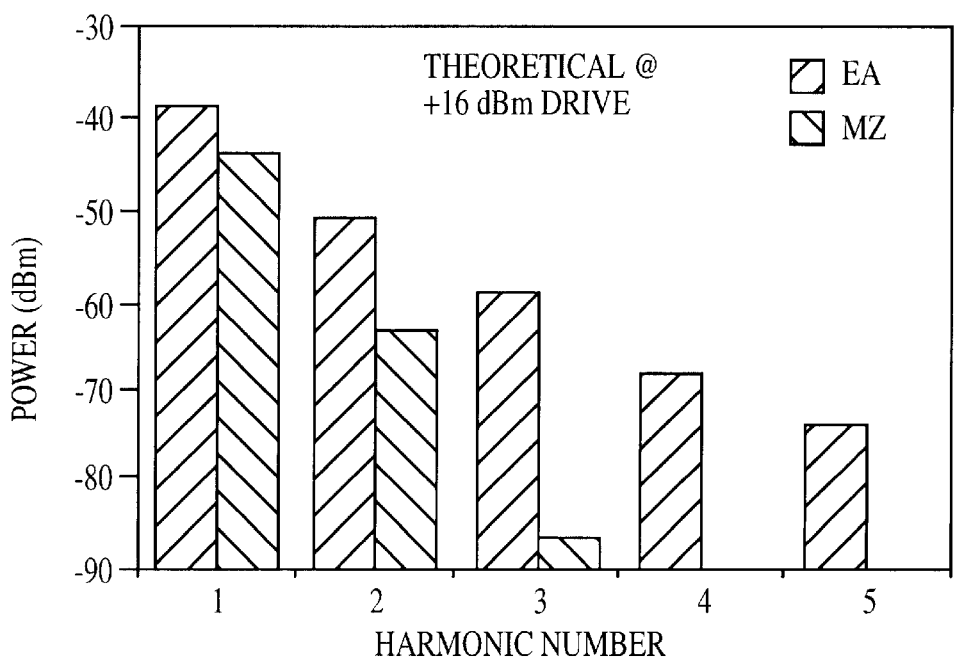
FIGS. 4a–4d show the maximum electrical power levels of the first five harmonics generated by an electroabsorption (EA) and a Hach-Zehndser (MZ) modulator, (a) shows the theoretically predicted performance with an electrical drive power of +16 dBm, (b) shows the experimentally observed performance, with +16 dBm electrical drive power, (c) shows the theoretically predicted performance, with an electrical drive power of +22 dBm, (d) show the experimentally observed performance, with an electrical drive power of +22 dBm.
Figure 4B:
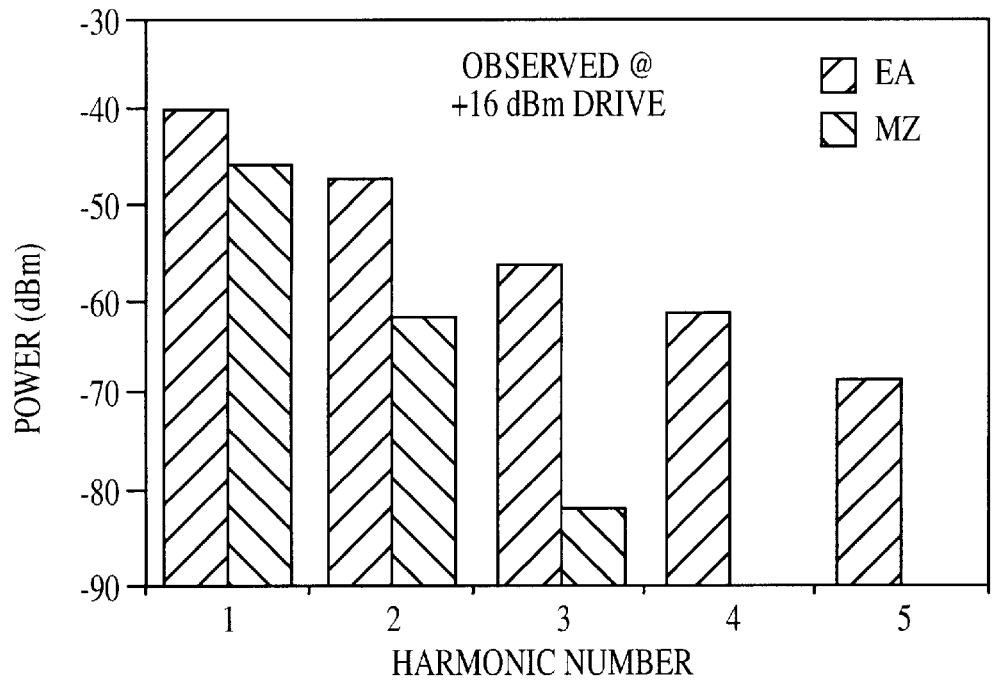
Figure 4C:
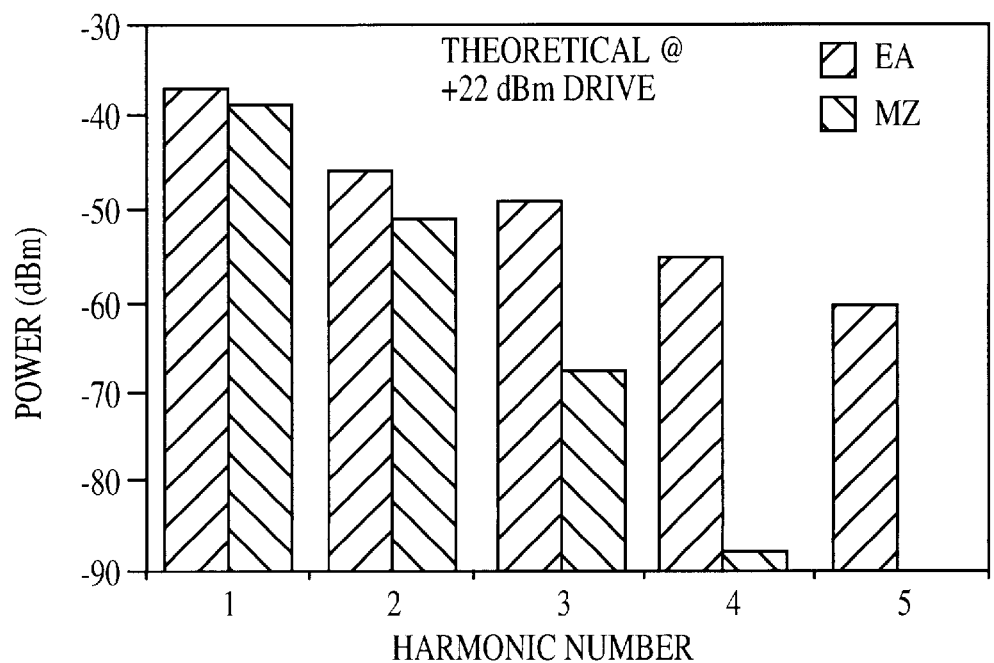
Figure 4D:
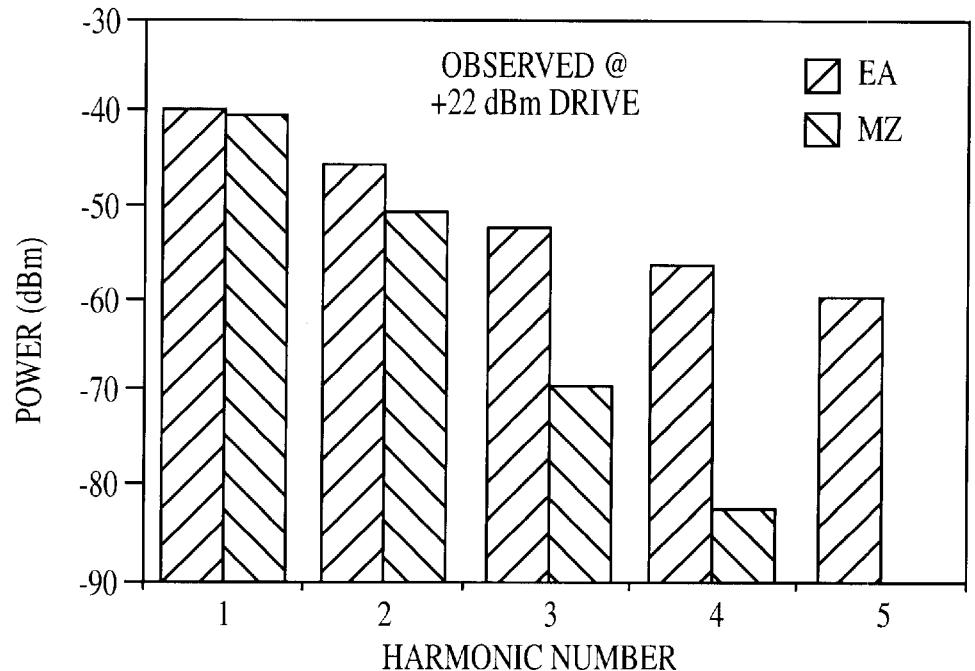

The maximum theoretically predicted, and experimentally achieved, RF power levels of each harmonic for both types of modulator and for both applied signal levels are shown in FIGS. 4a–4b. The plotted values are those that would have been detected by an idealised photodiode of 100% quantum efficiency and infinite bandwidth, so that the relative levels of each harmonic in FIG. 4 are independent of the actual photodiode responsivity at the frequency. As can be seen, predicted and experimental results are in good agreement. At both drive levels (16 and 22 dBm) the EA modulator was more efficient at generating higher order harmonics than the MZ modulator Using the same modelling approach that was used to accurately model modulator performance shown in FIG. 4, it is calculated that in order to generate fifth harmonics as effectively as when using the EA modulator at drive powers of +16 and +22 dBm, the MZ modulator would need to have values of $V_z$, at the drive frequency, of as low as 2.9 and 4.4V respectively.

To generate carriers at the preferred frequencies (18, 30 and 60 GHz) for radio-over-fibre applications the modulator used would need to be driven at a higher frequency than the 2.5 GHz used for comparison of EA and MZ performance. The EA modulator has a bandwidth of over 10 GHz thus it is anticipated that when the electrical modulating frequency is higher than 2.5 GHz optical carriers will also be efficiently generated at these higher frequencies. No known MZ modulators have a sufficiently low value of $V_z$, at a high enough modulation frequency, to be able to match the EA modulator effectiveness at generating a fifth harmonic when using the same drive powers.

Figure 5A:
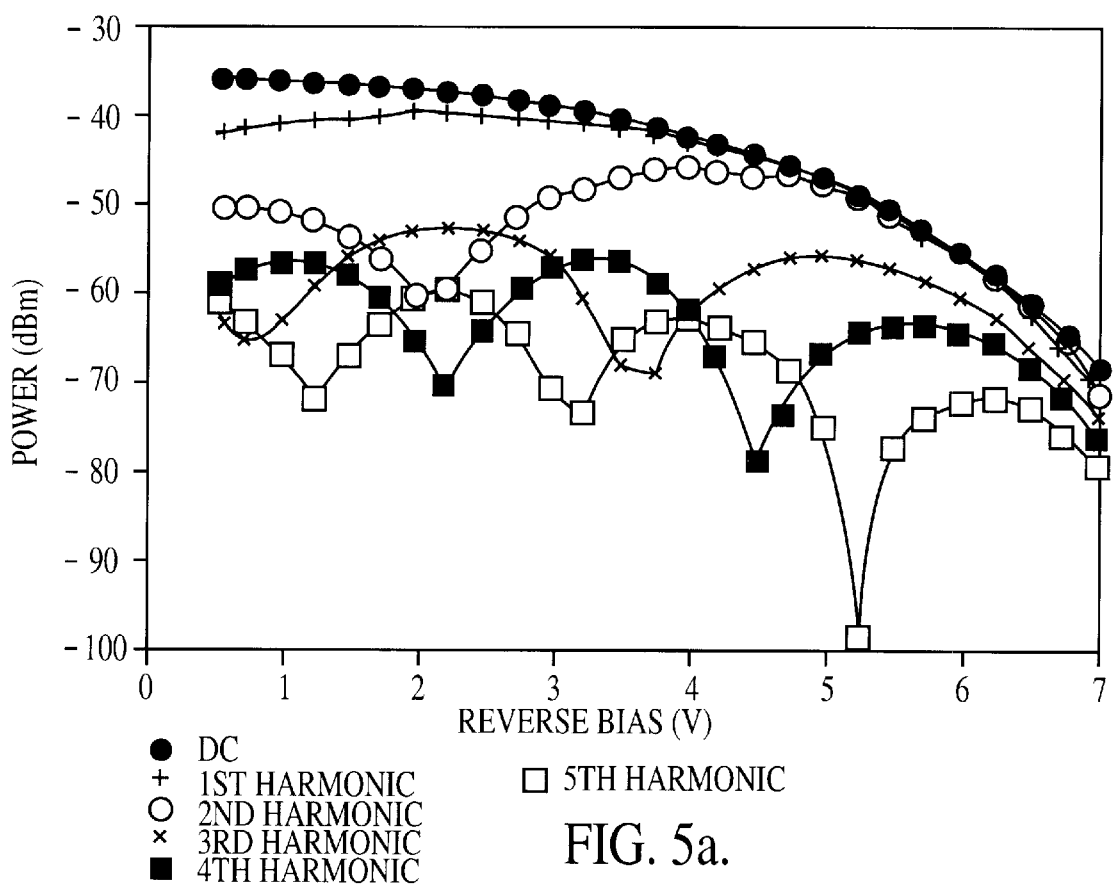
FIG. 5 shows the variation of electrical harmonic power levels with bias voltage for an electrical drive power of +22 dBm (a) for an EA modulator, and (b) for a HZ modulator.
Figure 5B:
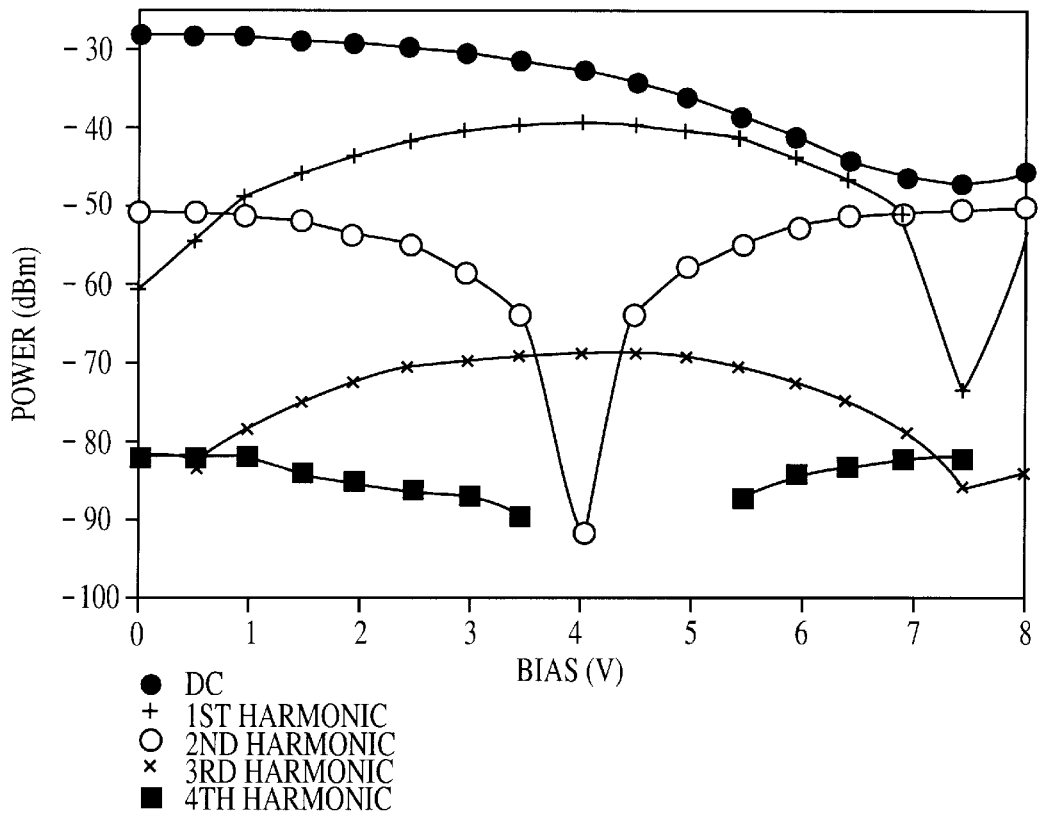

The performance of both electroabsorption modulators and Mach-Zehnder modulators vary significantly with the DC bias voltage applied to the modulator. This can be clearly seen from FIG. 5a, for the electroabsorption modulator, and FIG. 5b for the Mach-Zeshnder modulator, which shows the measured electrical power levels of the first five harmonics, for an electrical drive power of +22 dBm, against bias voltage, for the same input optical power level and for an idealised photodiode.

A further advantage of utilising an electroabsorption modulator, rather than a each Zehnder modulator, in addition to more efficient harmonic generation, can be deduced from FIG. 3. It can be seen from FIG. 3 that DC and harmonic power levels for the electroabsorption modulator converge under higher reverse bias, while those for the Mach-Zehnder modulator do not. This convergence is the result of the modulation depth increasing with increasing reverse bias. Thus an electroabsorption modulator, at the appropriate bias voltage, will have better modulation depth than a Mach-Zehnder modulator. This is important not only to prevent saturation of a photodiode, but also if any optical amplifier is to be used. For a given optical amplifier if the input optical signal has a higher modulation depth, and thus a lower DC component, more useful optical gain can be obtained before the optical amplifier is saturated.

Figure 6:
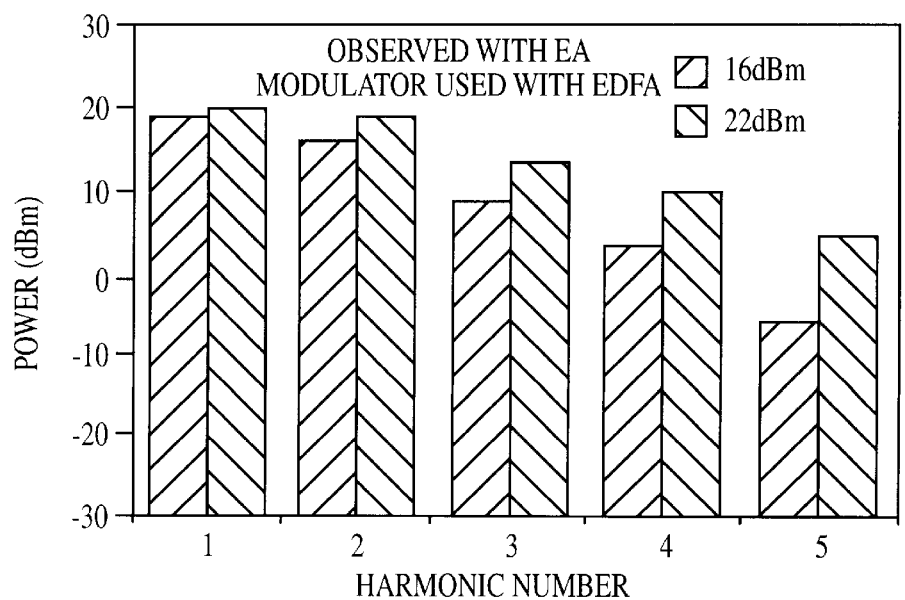
FIG. 6 is graph showing the maximum experimentally observed electrical power levels of the first five harmonics generated by an EA modulator when used in conjunction with an EDFA.

This affect is shown experimentally by utilising an erbium doped fibre amplifier, with an output power saturation of +15 dBm for input power above −20 dBm, to amplify the optical signal emerging from an electroabsorption modulator. The EDFA is followed by an optical attenuator set to 14 dB so as to avoid saturating the photodiode. Measurements of the harmonic power levels of the electrical spectrum were conducted, for 2.5 GHz signals of power +16 and +22 dBm applied to the EA modulator. Measured harmonic values have been corrected to give the electrical power levels that would be generated, in the absence of the optical attenuator, from an idealised photodiode, and the results are shown in FIG. 6. The decrease in power with increasing harmonic number is less than that observed at the same drive power when the EDFA was not used (FIGS. 4a–4b). Thus a EA modulator can advantageously be used as a harmonic generator in a radio-over-fibre system when an optical amplifier is used to boost the signal prior to transmission.

Although the specific embodiment of the present invention described herein employs a multi-quantum well electroabsorption modulator, it would be appreciated by the skilled person, that bulk semiconductor electroabsorption layers could also be employed in the present invention. In this case the Franz-Keldsh effect may be employed to enhance the change in absorption of the electroabsorption modulator with applied voltage. Furthermore, although the electroabsorption modulator described employs a reverse p-n junction structure, it will be appreciated by the skilled person, that alternative semiconductor structures could be employed e.g. a n-i-n structure or a schottky structure.

What is claimed is:

1. A source of radio frequency modulated optical radiation comprising:
   a semiconductor electroabsorption modulator having an optical input, an electrical input and an optical output, and
   a source of radio frequency electrical radiation electrically connected to the electrical input of the semiconductor electroabsorption modulator,
   wherein operating conditions for the modulator cause optical signals input to the optical input of the semiconductor electroabsorption modulator to be modulated at harmonics of the electrical radiation frequency and output from the optical output of the semiconductor electroabsorption modulator.

2. A source of radio frequency modulated optical radiation as in claim 1 wherein the electroabsorption modulator comprises a multi-quantum well electroabsorption layer.

3. A source of radio frequency modulated optical radiation as in claim 1 wherein the electroabsorption modulator comprises a reverse biased p-n junction structure.

4. A source of radio frequency modulated optical radiation as in claim 1 wherein the electroabsorption modulator comprises an optical waveguide.

5. A source of radio frequency modulated optical radiation as in claim 1 wherein the electroabsorption modulator is between 150 and 350 $\mu$m in length between its optical input and optical output.

6. A source of radio frequency modulated optical radiation as in claim 1 wherein the electroabsorption modulator is integrated with a distributed feedback laser.

7. A source of radio frequency modulated optical radiation as in claim 1 wherein the electrical radiation has a sinusoidal waveform.

8. A source of radio frequency modulated optical radiation as in claim 1 wherein the electroabsorption modulator is fabricated from semiconductor materials in the III–IV materials system.

9. A radio over fibre communications system comprising:
   a source of radio frequency modulated optical signals at a first site,
   a photodetector and transmitting radio antenna at a second site,
   a receiving radio antenna at a third site, and
   an optical fibre coupled at a first end to the source of radio frequency modulated optical signals and at a second end to the transmitting radio antenna, so that signals generated at the first site are transmitted optically to the second site via the optical fibre and are then transmitted from said transmitting radio antenna at the second site to said receiving radio antenna at the third site via free space,
   wherein said source of radio frequency modulated optical signals comprises a semiconductor electroabsorption modulator with an optical signal input to said modulator being modulated at least one harmonic of an electrical radio frequency signal input to said semiconductor electroabsorption modulator.

10. A radio over fibre communications system as in claim 9, further comprising an optical amplifier located between said first and said second sites for amplifying the radio frequency modulated optical signals.

11. A radio over fibre communications system as in claim 10 wherein the optical amplifier is a rare earth doped fibre amplifier.

12. A radio over fibre communications system as in claim 9 wherein the second, or higher, harmonic of an electrical drive signal applied to the electroabsorption modulator is employed to transmit communications data from the first site to the third site.

13. A radio over fibre communications systems as in claim 9 wherein the free space transmission from the second site into the third site is at millimeter wave frequencies.

14. A method of generating a modulated optical signal at a harmonic frequency of an input radio frequency signal, the method comprising the steps of:
   inputting an optical signal to a semiconductor electroabsorption modulator;
   applying an electrical modulation signal to the semiconductor electroabsorption modulator; and
   outputting an optical signal, modulated at least one harmonic frequency of the electrical signal, from the electroabsorption modulator.

* * * * *